United States Patent
Heitz et al.

(10) Patent No.: US 12,110,369 B2
(45) Date of Patent: Oct. 8, 2024

(54) METHOD FOR THE COMBINED PROCESSING OF AT LEAST TWO POLYMER MELTS

(71) Applicant: BASF SE, Ludwigshafen (DE)

(72) Inventors: Thomas Heitz, Ludwigshafen (DE); Johann Diedrich Brand, Waterloo (BE); Joerg Erbes, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 470 days.

(21) Appl. No.: 17/434,140

(22) PCT Filed: Mar. 5, 2020

(86) PCT No.: PCT/EP2020/055922
§ 371 (c)(1),
(2) Date: Aug. 26, 2021

(87) PCT Pub. No.: WO2020/187596
PCT Pub. Date: Sep. 24, 2020

(65) Prior Publication Data
US 2022/0145013 A1     May 12, 2022

(30) Foreign Application Priority Data
Mar. 19, 2019 (EP) ..................... 19163865

(51) Int. Cl.
  *C08J 3/00* (2006.01)
  *B29B 9/06* (2006.01)
  (Continued)

(52) U.S. Cl.
  CPC .................. *C08J 3/005* (2013.01); *B29B 9/06* (2013.01); *B29B 9/12* (2013.01); *B29B 11/06* (2013.01);
  (Continued)

(58) Field of Classification Search
  CPC .......... C08J 3/005; C08J 9/0061; C08J 9/122; C08J 9/18; C08J 2203/06; C08J 2203/22;
  (Continued)

(56) References Cited

U.S. PATENT DOCUMENTS

| | | | | |
|---|---|---|---|---|
| 8,066,948 B2 * | 11/2011 | Streng | ................ | B01F 35/2214 422/135 |
| 8,754,173 B2 * | 6/2014 | Loos | ....................... | C08L 67/04 528/307 |

(Continued)

FOREIGN PATENT DOCUMENTS

| | | | | |
|---|---|---|---|---|
| EP | 2995635 A1 | 3/2016 | | |
| WO | WO-2017157936 A1 * | 9/2017 | ........... | C07D 307/08 |

OTHER PUBLICATIONS

International Application No. PCT/EP2020/055922, International Search Report and Written Opinion, mailed Mar. 31, 2020.

(Continued)

*Primary Examiner* — Michael M. Bernshteyn
(74) *Attorney, Agent, or Firm* — Grüneberg and Myers PLLC

(57) ABSTRACT

The invention relates to a method for the combined processing of at least two polymer melts selected from the group consisting of (M1), (M2) and (M3), wherein (M1) is a polymer melt comprising a terephthalate polyester (A1), (M2) is a polymer melt comprising a copolyester (A2) on the basis of terephthalic acid, at least one aliphatic, ω-dicarboxylic acid and at least one aliphatic 1,ω-diol, and (M3) is a polymer melt 0 comprising a copolyester (A3) on the basis of terephthalic acid, at least one polytetramethylene glycol and at least one aliphatic 1,ω-diol. The method comprises the alternating processing of the at least two polymer melts (Continued)

into at least one product selected from the group consisting of pellets (P1), fibers (P2), expanded particles (P3), preforms (P4) and articles (P5).

14 Claims, 2 Drawing Sheets

(51) Int. Cl.
    *B29B 9/12*     (2006.01)
    *B29B 11/06*     (2006.01)
    *B29K 67/00*     (2006.01)
    *B29K 105/04*     (2006.01)
    *C08J 9/00*     (2006.01)
    *C08J 9/12*     (2006.01)
    *C08J 9/18*     (2006.01)
    *C08L 67/02*     (2006.01)
    *D01D 5/08*     (2006.01)
    *D01F 6/78*     (2006.01)

(52) U.S. Cl.
    CPC ............ *C08J 9/0061* (2013.01); *C08J 9/122* (2013.01); *C08J 9/18* (2013.01); *C08L 67/02* (2013.01); *C08L 67/025* (2013.01); *D01D 5/08* (2013.01); *D01F 6/78* (2013.01); *B29K 2067/003* (2013.01); *B29K 2105/048* (2013.01); *C08J 2203/06* (2013.01); *C08J 2203/22* (2013.01); *C08J 2367/02* (2013.01); *C08J 2467/02* (2013.01); *C08L 2203/12* (2013.01); *C08L 2203/14* (2013.01); *C08L 2203/30* (2013.01); *C08L 2205/025* (2013.01); *C08L 2205/03* (2013.01)

(58) Field of Classification Search
    CPC ..... C08J 2367/02; C08J 2467/02; B32B 9/06; B32B 9/12; B32B 11/06; C08L 67/02; C08L 67/025; C08L 2203/12; C08L 2203/14; C08L 2203/30; C08L 2205/025; C08L 2205/03; D01D 5/08; D01F 6/78
    USPC .......................................................... 521/59
    See application file for complete search history.

(56) References Cited

U.S. PATENT DOCUMENTS

| | | | |
|---|---|---|---|
| 10,669,374 B2* | 6/2020 | Costa | C08G 63/08 |
| 2009/0208381 A1* | 8/2009 | Streng | B01F 35/2214 |
| | | | 422/134 |
| 2012/0202928 A1* | 8/2012 | Loos | C08L 67/02 |
| | | | 524/95 |
| 2017/0240699 A1* | 8/2017 | Costa | C08G 63/08 |

OTHER PUBLICATIONS

Witte et al., "Simple Synthesis of 2-Substituted 2-Oxazolines and 5,6-Dihydro-4H- 1,3-oxazines", Communications, Angew. Chem. Internat. Edit., vol. 11, No. 4, Apr. 1972, pp. 287-288.

* cited by examiner

| OP | | R1 | R2 | R3 |
|---|---|---|---|---|
| OP1 | a | A1 | A1 | A1 |
| OP5 | a + b1 | A2 | A2 | A2 |
| OP2 | a + b2 | A2 | A1 | A1 |
| OP3 | a + c1 | A3 | A3 | A3 |
| OP6 | a + c2 | A1 | A1 | A3 |
| OP4 | a + b2 + c2 | A2 | A1 | A3 |

METHOD FOR THE COMBINED PROCESSING OF AT LEAST TWO POLYMER MELTS

CROSS-REFERENCE TO RELATED APPLICATIONS

This is the U.S. national phase of International Application No. PCT/EP2020/055922, filed Mar. 5, 2020, which claims the benefit of European Patent Application No. 19163865.9, filed on Mar. 19, 2019.

The invention relates to a method for the combined processing of at least two polymer melts selected from the group consisting of (M1), (M2) and (M3), wherein (M1) is a polymer melt comprising a terephthalate polyester (A1), (M2) is a polymer melt comprising a copolyester (A2) on the basis of terephthalic acid, at least one aliphatic 1, ω-dicarboxylic acid and at least one aliphatic 1, ω-diol, and (M3) is a polymer melt comprising a copolyester (A3) on the basis of terephthalic acid, at least one polytetramethylene glycol and at least one aliphatic 1, ω-diol. The method comprises the alternating processing of the at least two polymer melts into at least one product selected from the group consisting of pellets (P1), fibers (P2), expanded particles (P3), preforms (P4) and articles (P5).

Terephthalate (co)polyesters are well-known engineering plastics which have found application in many industries. They possess excellent mechanical, electrical and thermal properties, together with high chemical resistance and dimensional stability. Terephthalate (co)polyesters are generally prepared by polycondensation of terephthalic acid, at least one polyhydroxy compound comprising at least two hydroxyl groups and optionally at least one further component selected e.g. from aliphatic dicarboxylic acids, aromatic dicarboxylic acids and polyalkylene glycols.

Terephthalate copolyesters based on aliphatic and aromatic dicarboxylic acids can be used in biodegradable products or in fibres for clothing, while terephthalate copolyesters based on polyalkylene glycols which are also known as thermoplastic polyester elastomers can be used in tubes or seals.

As the polycondensation is usually carried out at temperatures which are above the melting point of the terephthalate (co)polyesters, the terephthalate (co)polyesters are usually present in the form of melts after the polycondensation. The melts are optionally processed into at least one product, for example at least one product selected from the group consisting of pellets, fibers, expanded particles, preforms and articles. Generally, only one terephthalate (co) polyester melt can be processed. If it is desired to process many different terephthalate (co)polyester melts, it is necessary to rebuild the reactors for the processing after the processing of each terephthalate (co)polyester melt, which is very expensive and time consuming.

Therefore, the object underlying the present invention is to provide a continuous method for the combined processing of at least two different terephthalate (co)polyester melts.

This object is achieved by a method for the combined processing of at least two polymer melts selected from the group consisting of (M1), (M2) and (M3), wherein
  (M1) is a polymer melt comprising a terephthalate polyester (A1),
  (M2) is a polymer melt comprising a copolyester (A2) on the basis of terephthalic acid, at least one aliphatic 1,ω-dicarboxylic acid and at least one aliphatic 1,ω-diol, and
  (M3) is a polymer melt comprising a copolyester (A3) on the basis of terephthalic acid, at least one polytetramethylene glycol and at least one aliphatic 1, ω-diol, wherein
the method comprises the alternating processing of the at least two polymer melts into at least one product selected from the group consisting of pellets (P1), fibres (P2), expanded particles (P3), preforms (P4) and articles (P5).

It has surprisingly been found that the inventive method allows for a continuous combined processing of at least two polymer melts selected from the group of (M1), (M2) and (M3), wherein (M1) is a polymer melt comprising a terephthalate polyester, (M2) is a polymer melt comprising a copolyester on the basis of terephthalic acid, at least one aliphatic 1, ω-dicarboxylic acid and at least one aliphatic 1, ω-diol, and (M3) is a polymer melt comprising a copolyester on the basis of terephthalic acid, at least one polytetramethylene glycol and at least one aliphatic 1, ω-diol, into at least one product selected from the group consisting of pellets, fibers, expanded particles, preforms and articles. In addition, the at least two polymer melts selected from the group of (M1), (M2) and (M3) can also combinedly be produced in a respective polycondensation reactor.

Furthermore, the at least one product selected from the group consisting of pellets, fibers, expanded particles, preforms and articles can be prepared in large quantities.

If desired, in the inventive method, also further polymer melts selected from the group consisting of terephthalate copolyesters can be processed into at least one product selected from the group consisting of pellets, fibers, expanded particles, preforms and articles. This makes the inventive method very versatile and simple to use.

Figures 1, 2:
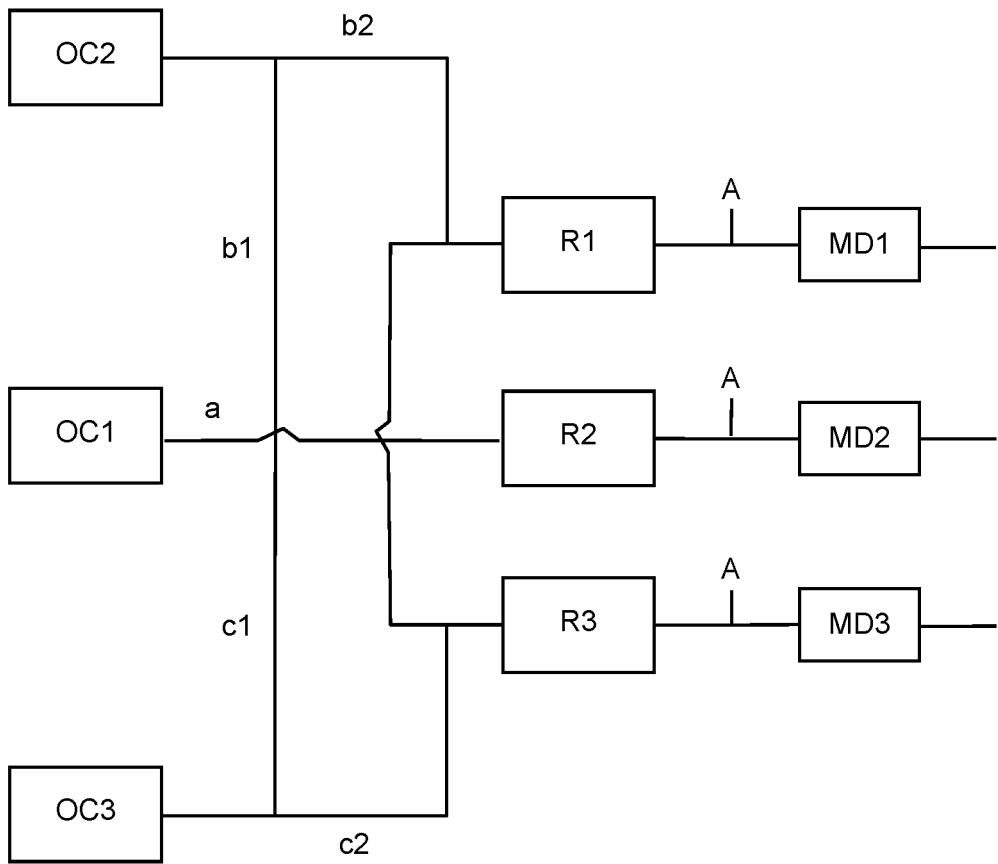
FIG. 1 shows a schematic of the oligomer compositions (OC1), (OC2), and (OC3).
FIG. 2 shows a chart of the operation modes (OP1), (OP2), (OP3), (OP4), (OP5), and (OP6).

The present invention will be described in more detail hereinafter:

In the inventive method, at least two polymer melts selected from the group consisting of (M1), (M2) and (M3), wherein
  (M1) is a polymer melt comprising a terephthalate polyester (A1),
  (M2) is a polymer melt comprising a copolyester (A2) on the basis of terephthalic acid, at least one aliphatic 1, ω-dicarboxylic acid and at least one aliphatic 1, ω-diol, and
  (M3) is a polymer melt comprising a copolyester (A3) on the basis of terephthalic acid, at least one polytetramethylene glycol and at least one aliphatic 1, ω-diol,
  are combinedly processed.

Polymer Melt (M1)

The polymer melt (M1) comprises the terephthalate polyester (A1).

Preferably, the polymer melt (M1) comprises at least 90% by weight, more preferably at least 95% by weight, and most preferably at least 97% by weight of the terephthalate polyester (A1), based on the total weight of the polymer melt (M1).

Likewise, the polymer melt (M1) preferably comprises not more than 99.99% by weight, more preferably not more than 99.9% by weight, and most preferably not more than 99.8% by weight of the terephthalate polyester (A1), based on the total weight of the polymer melt (M1).

In a preferred embodiment, the polymer melt (M1) comprises from 90 to 99.99% by weight, preferably from 95 to 99.9% by weight, and especially from 97 to 99.8% by weight of the terephthalate polyester (A1), based on the total weight of the polymer melt (M1).

The polymer melt (M1) can also comprise at least one additive (A). What is meant by "at least one additive (A)" is precisely one additive (A) as well as mixtures of two or more additives (A).

Preferably, the at least one additive is selected from the group consisting of lubricants, colorants, colour stabilizers, antistatic agents, flame retardants, agents for increasing resistance to ultraviolet light, stabilizers for improving heat resistance, mould release agents, nucleating agents and plasticizers.

Suitable lubricants and mould release agents include, but are not limited to, stearic acids, stearyl alcohol, stearic esters, ethylene bis(stearamide) (EBS) and generally higher fatty acids, their derivatives, and corresponding fatty acid mixtures having from 12 to 30 carbon atoms, silicone oils, oligomeric isobutylene, or similar substances.

Suitable colour stabilizers and agents for increasing resistance to ultraviolet light include, but are not limited to, sterically hindered phenols, secondary aromatic amines, hydroquinones, resorcinols, vitamin E or analogous-structure compounds, copper(I) halides, hindered amine light stabilizers ("HALS"), quenchers, such as nickel quenchers, hydroperoxide decomposers, triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones and salicylates.

Suitable colorants include, but are not limited to, organic dyes, such as nigrosin, or pigments, such as ultramarine blue, phthalocyanines, titanium dioxide, cadmium sulfides, cadmium selenide, carbon black and derivatives of perylenetetracarboxylic acid.

Suitable flame retardants include, but are not limited to, usually red phosphorus, ammonium polyphosphate, tris(2-chloroethyl) phosphate, tris(2-chloropropyl) phosphate, tetrakis(2-chloroethyl)ethylene diphosphate, dimethyl methane phosphonate, diethyl diethanolaminomethylphosphonate, aluminium diethylphosphinate or derivatives thereof (Exolit®), aluminium hypophosphite and combinations thereof.

Suitable stabilizers for improving heat resistance include, but are not limited to, metal halides (chlorides, bromides, iodides) derived from metals of group I of the Periodic Table of the Elements (e.g. Li, Na, K).

Suitable nucleating agents include, but are not limited to, sodium phenylphosphinate, alumina, silica, nylon-2,2, and also preferably talc.

Suitable plasticizers include, but are not limited to, dioctyl phthalate, dibenzyl phthalate, butyl benzyl phthalate, hydrocarbon oils, N-(n-butyl)-benzenesulfonamide and ortho- and para-tolylethylsulfonamide.

The polymer melt (M1) preferably comprises at least 0.01% by weight, more preferably at least 0.1% by weight and most preferably at least 0.2% by weight of the at least one additive (A), based on the total weight of the polymer melt (M1).

Likewise, the polymer melt (M1) preferably comprises not more than 10% by weight, more preferably not more than 5% by weight and most preferably not more than 3% by weight of the at least one additive (A), based on the total weight of the polymer melt (M1).

In a preferred embodiment, the polymer melt (M1) comprises from 0.01 to 10% by weight, preferably from 0.1 to 5% by weight and especially from 0.2 to 3% by weight of the at least one additive (A), based on the total weight of the polymer melt (M1).

The percent by weight of the terephthalate polyester (A1) and the at least one additive (A) in the polymer melt (M1) generally add up to 100%.

Further, the polymer melt (M1) can also comprise at least one catalyst (C) as well as at least one antioxidant, wherein the at least one catalyst (C) as well as the at least one antioxidant result from the production process of the terephthalate polyester (A1).

In case the polymer melt (M1) comprises at least one catalyst (C) and at least one antioxidant, the percent by weight of the terephthalate polyester (A1), the at least one additive (A), the at least one catalyst (C) and the at least one antioxidant in the polymer melt (M1) generally add up to 100%.

Preferably, the terephthalate polyester (A1) is the polycondensation product of
i) 100 mol %, based on component i), of terephthalic acid, and
ii) 100 to 104 mol %, based on component i), of at least one aliphatic 1, ω-diol.

Therefore, the present invention also provides a method, wherein the terephthalate polyester (A1) is the polycondensation product of
i) 100 mol %, based on component i), of terephthalic acid, and
ii) 100 to 104 mol %, based on component i), of at least one aliphatic 1, ω-diol.

Within the context of the present invention, the term "terephthalic acid" comprises the terephthalic acid itself as well as the derivatives of the terephthalic acid such as the terephthalic acid esters. Suitable terephthalic acid esters are the di-$C_1$-$C_6$-alkyl esters of the terephthalic acid such as the di-methyl-, di-ethyl-, di-n-propyl-, di-iso-propyl-, di-n-butyl-, di-iso-butyl-, di-t-butyl-, di-n-pentyl-, di-iso-pentyl- or di-n-hexyl esters of the terephthalic acid.

"At least one aliphatic 1, ω-diol" means precisely one aliphatic 1, ω-diol as well as mixtures of two or more aliphatic 1, ω-diols. In a preferred embodiment, the terephthalate polyester (A1) is the polycondensation product of terephthalic acid and precisely one aliphatic 1, ω-diol.

Aliphatic 1, ω-diols are known per se.

Examples for aliphatic 1, ω-diols are 1,2-ethanediol, 1,3-propanediol, 1,4-butanediol, 1,5-pentanediol, 1,6-hexanediol, 2,2-dimethyl-1,3-propanediol, 2-ethyl-2-butyl-1,3-propanediol, 2-ethyl-2-isobutyl-1,3-propanediol, 1,4-cyclohexane-dimethanol, 2,2,4-trimethyl-1,6-hexanediol or diethylene glycol.

For the purpose of the present invention, the at least one aliphatic 1, ω-diol is preferably selected from aliphatic 1, ω-diols having 2 to 12, more preferably from aliphatic 1, ω-diols having 4 to 6, carbon atoms. The aliphatic 1, ω-diols can be linear or branched.

In a preferred embodiment, the at least one aliphatic 1, ω-diol is selected from the group consisting of 1,2-ethanediol, 1,3-propanediol, 1,4-butanediol and diethylene glycol, more preferably the at least one aliphatic 1, ω-diol is 1,2-ethanediol or 1,4-butanediol.

It is clear for the skilled person that also the above-mentioned esters of the terephthalic acid can be used. The esters of the above-mentioned terephthalic acid can be used individually as well as in the form of mixtures of two or more esters of the terephthalic acid.

In addition, a mixture of the terephthalic acid and at least one ester of the terephthalic acid may also be used.

However, it is also possible to use at least one aromatic 1, ω-dicarboxylic acid which is different from terephthalic acid, for example, phthalic acid, 2,5-furandicarboxylic acid, 2,6-naphthalenedicarboxylic acid or 1,5-naphthalenedicarboxylic acid, or a combination of terephthalic acid and at least one different aromatic 1, ω-dicarboxylic acid.

In this case, the terephthalate polyester (A1) is the polycondensation product of
  i) 100 mol %, based on component i), of at least one aromatic 1, ω-dicarboxylic acid, and
  ii) 100 to 104 mol %, based on component i), of at least one aliphatic 1, ω-diol.

Within the context of the present invention, the term "aromatic 1, ω-dicarboxylic acid" also comprises the aromatic 1, ω-dicarboxylic acids themselves as well as the derivatives of the aromatic 1, ω-dicarboxylic acids such as the aromatic 1, ω-dicarboxylic esters. Suitable aromatic 1, ω-dicarboxylic esters are the di-$C_1$-$C_6$-alkyl esters of the aromatic 1, ω-dicarboxylic acids such as the di-methyl-, di-ethyl-, di-n-propyl-, di-iso-propyl-, di-n-butyl-, di-iso-butyl-, di-t-butyl-, di-n-pentyl-, di-iso-pentyl- or di-n-hexyl esters of the aromatic 1, ω-dicarboxylic acids.

It is clear for the skilled person that also the above-mentioned esters of the aromatic 1, ω-dicarboxylic acid can be used. The esters of the above-mentioned aromatic 1, ω-dicarboxylic acids can be used individually as well as in the form of mixtures of two or more esters of the aromatic 1, ω-dicarboxylic acids.

In addition, a mixture of the terephthalic acid and at least one ester of the at least one aromatic 1, ω-dicarboxylic acid may also be used.

In a preferred embodiment, the terephthalate polyester (A1) is polyethylene terephthalate (PET), polytrimethylene terephthalate (PTT) or polybutylene terephthalate (PBT).

In a further particularly preferred embodiment, the terephthalate polyester is polybutylene terephthalate (PBT).

The terephthalate polyester (A1) generally has an acid number of <50 meq/kg, preferably <35 meq/kg, and more preferably <30 meq/kg. The acid number is determined by titration with sodium hydroxide or by FTIR measurement.

Furthermore, the weight average molecular weight ($M_w$) of the terephthalate polyester (A1) is customarily in the range from 2 000 to 80 000 g/mol, preferably in the range from 5 000 to 80 000 g/mol, and more preferably in the range from 20 000 to 80 000 g/mol. The weight average molecular weight ($M_w$) is determined according to ASTM D5001.

The terephthalate polyester (A1) generally has a viscosity number in the range from 60 to 180 ml/g, preferably in the range from 90 to 170 ml/g, and more preferably in the range from 100 to 165 ml/g. The viscosity number is determined in a solution of 0.5% by weight of the terephthalate polyester in a mixture of phenol/trichlorobenzene in accordance with ISO 307.

To obtain the polymer melt (M1), the terephthalate polyester (A1) and optionally the at least one additive (A) are preferably melt-mixed in a mixing device (MD1).

The melt-mixing is preferably carried out motionlessly, for example statically.

Preferably, the at least one additive (A) is added to the terephthalate polyester (A1) in the mixing device (MD1).

If present, the at least one additive (A) is added in a customary manner to the terephthalate polyester (A1), for example individually or together, as such, as a solution, a melt, a suspension or as a masterbatch.

Polymer Melt (M2)

The polymer melt (M2) comprises a copolyester (A2) on the basis of terephthalic acid, at least one aliphatic 1, ω-dicarboxylic acid and at least one aliphatic 1, ω-diol.

Preferably, the polymer melt (M2) comprises at least 90% by weight, more preferably at least 95% by weight, and most preferably at least 97% by weight of the copolyester (A2), based on the total weight of the polymer melt (M2).

Likewise, the polymer melt (M2) preferably comprises not more than 99.99% by weight, more preferably not more than 99.9% by weight, and most preferably not more than 99.8% by weight of the copolyester (A2), based on the total weight of the polymer melt (M2).

In a preferred embodiment, the polymer melt (M2) comprises from 90 to 99.99% by weight, preferably from 95 to 99.9% by weight, and especially from 97 to 99.8% by weight of the copolyester (A2), based on the total weight of the polymer melt (M2).

The polymer melt (M2) can also comprise at least one additive (A). What is meant by "at least one additive (A)" is precisely one additive (A) as well as mixtures of two or more additives (A).

The above-mentioned embodiments and preferences with respect to the at least one additive (A) comprised in the polymer melt (M1) apply analogously to the at least one additive (A) comprised in the polymer melt (M2).

The polymer melt (M2) preferably comprises at least 0.01% by weight, more preferably at least 0.1% by weight and most preferably at least 0.2% by weight of the at least one additive (A), based on the total weight of the polymer melt (M2).

Likewise, the polymer melt (M2) preferably comprises not more than 10% by weight, more preferably not more than 5% by weight and most preferably not more than 3% by weight of the at least one additive (A), based on the total weight of the polymer melt (M2).

In a preferred embodiment, the polymer melt (M2) comprises from 0.01 to 10% by weight, preferably from 0.1 to 5% by weight and especially from 0.2 to 3% by weight of the at least one additive (A), based on the total weight of the polymer melt (M2).

The percent by weight of the copolyester (A2) and the at least one additive (A) in the polymer melt (M2) generally add up to 100%.

Further, the polymer melt (M2) can also comprise at least one catalyst (C) as well as at least one antioxidant, wherein the at least one catalyst (C) as well as the at least one antioxidant result from the production process of the copolyester (A2).

In case the polymer melt (M2) comprises at least one catalyst (C) and at least one antioxidant, the percent by weight of the copolyester (A2), the at least one additive (A), the at least one catalyst (C) and the at least one antioxidant in the polymer melt (M2) generally add up to 100%.

Preferably, the copolyester (A2) is the polycondensation product of
  i) 30 to 60 mol %, based on components i) to ii) of terephthalic acid,
  ii) 40 to 70 mol %, based on components i) to ii), of at least one aliphatic 1, ω-dicarboxylic acid, and
  iii) 100 to 106 mol %, based on components i) to ii), of at least one aliphatic 1, ω-diol.

Therefore, the present invention also provides a method wherein the copolyester (A2) is the polycondensation product of i) 30 to 60 mol %, based on components i) to ii), of terephthalic acid,
ii) 40 to 70 mol %, based on components i) to ii), of at least one aliphatic 1, ω-dicarboxylic acid, and
iii) 100 to 106 mol %, based on components i) to ii), of at least one aliphatic 1, ω-diol.

The above-mentioned embodiments and preferences with respect to the terephthalic acid and the at least one aliphatic 1, ω-diol used in the preparation of the terephthalate polyester (A1) comprised in the polymer melt (M1) apply analogously to the terephthalic acid and the at least one aliphatic 1, ω-diol used in the preparation of the copolyester (A2) comprised in the polymer melt (M2).

"At least one aliphatic 1, ω-dicarboxylic acid" means precisely one aliphatic 1, ω-dicarboxylic acid as well as mixtures of two or more aliphatic 1, ω-dicarboxylic acids. In a preferred embodiment, only one aliphatic 1, ω-dicarboxylic acid is used.

Aliphatic 1, ω-dicarboxylic acids are known to a skilled person.

Preferably, the at least one aliphatic 1, ω-dicarboxylic acid is selected from aliphatic 1, ω-dicarboxylic acids having 2 to 40 carbon atoms, more preferably from aliphatic 1, ω-dicarboxylic acids having 4 to 17 carbon atoms. The aliphatic 1, ω-dicarboxylic acids can be linear or branched.

Within the context of the present invention, the term "aliphatic 1, ω-dicarboxylic acids" comprises the aliphatic 1, ω-dicarboxylic acids themselves as well as the derivatives of the aliphatic 1, ω-dicarboxylic acids such as the aliphatic 1, ω-dicarboxylic esters. Suitable aliphatic 1, ω-dicarboxylic esters are the di-$C_1$-$C_6$-alkyl esters of the aliphatic 1, ω-dicarboxylic acids such as the di-methyl-, di-ethyl-, di-n-propyl-, di-iso-propyl-, di-n-butyl-, di-iso-butyl-, di-t-butyl-, di-n-pentyl-, di-iso-pentyl- or di-n-hexyl esters of the aliphatic 1, ω-dicarboxylic acids.

Examples for aliphatic 1, ω-dicarboxylic acids are malonic acid, succinic acid, 2-methyl succinic acid, glutaric acid, 2-methyl glutaric acid, 3-methyl glutaric acid, adipic acid, pimelic acid, cork acid, azelaic acid, sebacic acid, undecanedioic acid, dodecandioic acid, brassic acid, tetradecandioic acid, fumaric acid, 2,2-dimethylglutaric acid, dimer fatty acid (such as EMPOL® 1061 from Cognis), 1,3-cyclopentanedicarboxylic acid, diglycolic acid, itaconic acid, maleic acid or 2,5-norbornendicarboxylic acid.

Particularly preferred aliphatic 1, ω-dicarboxylic acids are succinic acid, glutaric acid, adipic acid, azelaic acid, sebacic acid or brassic acid, especially preferred are succinic acid, adipic acid or sebacic acid.

The present invention therefore also provides a method, wherein the at least one aliphatic 1, ω-dicarboxylic acid is selected from the group consisting of succinic acid, adipic acid and sebacic acid.

In a preferred embodiment of the present invention the aliphatic 1, ω-dicarboxylic acid is adipic acid.

It is clear for the skilled person that also the above-mentioned esters of the aliphatic 1, ω-dicarboxylic acids can be used. The esters of the above-mentioned aliphatic 1, ω-dicarboxylic acids can be used individually as well as in the form of mixtures of two or more esters of the aliphatic 1, ω-dicarboxylic acids.

In addition, a mixture of at least one aliphatic 1, ω-dicarboxylic acid and at least one ester of an aliphatic 1, ω-dicarboxylic acid may also be used.

The copolyester (A2) generally has an acid number of <50 meq/kg, preferably <35 meq/kg, and more preferably <25 meq/kg. The acid number is determined by titration with sodium hydroxide or by FTIR measurement.

To obtain the polymer melt (M2), the copolyester (A2) and optionally the at least one additive (A) are preferably melt-mixed in a mixing device (MD2).

The melt-mixing is preferably carried out motionlessly, for example statically.

Preferably, the at least one additive (A) is added to the copolyester (A2) in the mixing device (MD2).

If present, the at least one additive (A) is also added in a customary manner to the copolyester (A2), for example individually or together, as such, as a solution, a melt, a suspension or as a masterbatch.

In a further embodiment, before melt-mixing with the at least one additive (A), preferably, the copolyester (A2) is reacted continuously with at least one chain extender in a polyaddition reaction.

Preferably, the copolyester (A2) is reacted continuously with 0.01 to 4% by weight of at least one chain extender, based on the total weight of the copolyester (A2) and the at least one chain extender.

Suitable chain extenders are selected from the group consisting of di- or oligofunctional isocyanates and/or isocyanurates, di- or oligofunctional peroxides, di- or oligofunctional epoxides and di- or oligofunctional oxazolines, oxazines and/or carbodiimides.

Suitable di- or oligofunctional isocyanates and/or isocyanurates comprise an isocyanate or a mixture of various isocyanates. It is possible to use aromatic or aliphatic diisocyanates. However, it is also possible to use isocyanates of higher functionality.

For the purposes of the present invention, an aromatic diisocyanate is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, or xylylene diisocyanate.

Among these, particular preference is given to diphenylmethane 2,2'-, 2,4'-, or 4,4'-diisocyanate. The latter diisocyanates are generally used in the form of a mixture.

An isocyanate that can also be used, having three rings, is tri(4-isocyanato-phenyl)methane. Polynuclear aromatic diisocyanates are produced by way of example during production of diisocyanates having one or two rings.

Suitable di- or oligofunctional isocyanates and/or isocyanurates can also comprise subordinate amounts of uretdione groups, for example up to 5% by weight, based on the total weight of the di- or oligofunctional isocyanates and/or isocyanurates, for example for capping of the isocyanate groups.

For the purposes of the present invention, an aliphatic diisocyanate is especially any of the linear or branched alkylene diisocyanates or cycloalkylene diisocyanates having from 2 to 20 carbon atoms, preferably from 3 to 12 carbon atoms, examples being hexamethylene 1,6-diisocyanate, isophorone diisocyanate, or methylenebis(4-isocyanatocyclohexane). Particularly preferred aliphatic diisocyanates are isophorone diisocyanate and especially hexamethylene 1,6-diisocyanate.

Among the preferred isocyanurates are the aliphatic isocyanurates that derive from alkylene diisocyanates or from cycloalkylene diisocyanates, where these have from 2 to 20 carbon atoms, preferably from 3 to 12 carbon atoms, examples being isophorone diisocyanate or methylenebis(4-isocyanatocyclohexane). These alkylene diisocyanates can be either linear or branched compounds. Particular preference is given to isocyanurates based on n-hexamethylene diisocyanate, examples being cyclic trimers, pentamers, or higher oligomers of hexamethylene 1,6-diisocyanate.

The amounts generally used of di- or oligofunctional isocyanates and/or isocyanurates are from 0.01 to 4% by weight, preferably from 0.05 to 2% by weight, particularly preferably from 0.2 to 1.2% by weight, based on the total weight of the copolyester (A2) and the at least one chain extender.

Examples of suitable di- or oligofunctional peroxides are the following compounds: benzoyl peroxide, 1,1-bis(tert-butylperoxy)-3,3,5-trimethylcyclohexane, 1,1-bis(tert-butylperoxy)methylcyclododecane, n-butyl 4,4-bis(butylperoxy)valerate, dicumyl peroxide, tert-butyl peroxybenzoate, dibutyl peroxide, α,α-bis(tert-butyl-peroxy)diisopropylbenzene, 2,5-dimethyl-2,5-di(tert-butylperoxy)hexane, 2,5-dimethyl-2,5-di(tert-butylperoxy)hex-3-yne, and tert-butylperoxycumene.

The amount used of di- or oligofunctional peroxides is from 0.01 to 4% by weight, preferably from 0.1 to 2% by weight, and particularly preferably from 0.2 to 1% by weight, based on the total weight of the copolyester (A2) and the at least one chain extender.

The di- or oligofunctional epoxides used can comprise difunctional or oligofunctional epoxides, such as: hydroquinone, diglycidyl ether, resorcinol diglycidyl ether, 1,6-hexanediol diglycidyl ether, and hydrogenated bisphenol A diglycidyl ether. Other examples of epoxides comprise diglycidyl terephthalate, diglycidyl tetrahydrophthalate, diglycidyl hexahydro-phthalate, dimethyldiglycidyl phthalate, phenylene diglycidyl ether, ethylene diglycidyl ether, trimethylene diglycidyl ether, tetramethylene diglycidyl ether, hexamethylene diglycidyl ether, sorbitol diglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentyl glycol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, and polybutylene glycol diglycidyl ether.

A particularly suitable di- or oligofunctional epoxide is a copolymer comprising epoxy groups and based on styrene, acrylic ester and/or methacrylic ester. The units bearing epoxy groups are preferably glycidyl (meth)acrylates. Compounds that have proven advantageous are copolymers having a proportion of more than 20% by weight, particularly preferably more than 30% by weight, and with particular preference more than 50% by weight, of glycidyl methacrylate in the copolymer. The epoxy equivalent weight (EEW) in these polymers is preferably from 150 to 3000 g/equivalent, particularly preferably from 200 to 500 g/equivalent. The average molecular weight (weight average) $M_w$ of the polymers is preferably from 2000 to 25 000 g/mol, in particular from 3000 to 8000 g/mol. The average molecular weight (number average) $M_n$ of the polymers is preferably from 400 to 6000 g/mol, in particular from 1000 to 4000 g/mol. The polydispersity (Q) is generally from 1.5 to 5. Copolymers of the abovementioned type comprising epoxy groups are marketed by way of example by BASF Resins B.V. with trademark Joncryl® ADR. Particularly suitable chain extenders are Joncryl® ADR 4368, long-chain acrylates as described in EP Application No. 08166596.0, and Cardura® E10 from Shell.

The amount of di- or oligofunctional epoxides used, based on the total weight of the copolyester (A2) and the at least one chain extender, is from 0.01 to 4% by weight, preferably from 0.1 to 2% by weight, and particularly preferably from 0.2 to 1% by weight.

The di- or oligofunctional epoxides can also be used as acid scavenger. In this embodiment, it is preferable that the concentration of the di- or oligofunctional epoxides used is from 0.01 to 0.5% by weight.

The at least one chain extender used can also be selected from di- or oligofunctional oxazolines, oxazines and/or carbodiimides.

Bisoxazolines are generally obtainable by the process disclosed in Angew. Chem. Int. Ed., vol. 11 (1972), pp. 287-288. Particularly preferred bisoxazolines and bisoxazines are those in which the bridging member is a single bond, a $(CH_2)_z$-alkylene group; where z=2, 3, or 4, e.g. methylene, ethane-1,2-diyl, propane-1,3-diyl, or propane-1,2-diyl, or a phenylene group. Particularly preferred bisoxazolines that may be mentioned are 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene. Further examples are: 2,2'-bis(2-oxazoline), 2,2'bis(4-methyl-2-oxazoline), 2,2'-bis(4,4'-dimethyl-2-oxazoline), 2,2'-bis(4-ethyl-2-oxazoline), 2,2'-bis(4,4¹-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(4-methyl-2-oxazoline), 2,2'-p-phenylenebis(4,4'dimethyl-2-oxazoline), 2,2'-m-phenylenebis(4-methyl-2-oxazoline), 2,2'-m-phenylenebis(4,4'-dimethyl-2-oxazoline), 2,2'-hexamethylenebis(2-oxazol ine), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4¹-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline).

Preferred bisoxazines are 2,2'-bis(2-oxazine), bis(2-oxazinyl)methane, 1,2-bis(2-oxazinyl)ethane, 1,3-bis(2-oxazinyl)propane, or 1,4-bis(2-oxazinyl)butane, in particular 1,4-bis(2-oxazinyl)benzene, 1,2-bis(2-oxazinyl)benzene, or 1,3-bis(2-oxazinyl)-benzene.

Carbodiimides and polymeric carbodiimides are marketed by way of example by Lanxess with trademark Stabaxol® or by Elastogran with trademark Elastostab®.

Examples are: N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenyl-carbodiimide, N-tolyl-N'-cyclohexylcarbodiimide, N,N'-di-2,6-di-tert-butylphenyl-carbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexyl-carbodiimide, N,N'-di-p-tolylcarbodiimide, p-phenylenebisdi-o-tolylcarbodiimide, p-phenylenebisdicyclohexylcarbodiimide, hexamethylenebisdicyclohexylcarbodiimide, 4,4'-dicyclohexyl-methanecarbodiimide, ethylenebisdiphenylcarbodiimide, N,N'-benzyl-carbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropyl phenylcarbodiimide, N,N'-di-p-isopropylphenylcarbodiim ide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6- trimethylphenylcarbodiimide, N,N'-di-2,4,6-triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, tert-butylisopropylcarbodiimide, di-β-naphthylcarbodiimide, and di-tert-butylcarbodiimide.

The amount of the di- or oligofunctional oxazolines, oxazines and/or carbodiimides used, based on the total weight of the copolyester (A2) and the at least one chain extender, is generally from 0.01 to 4% by weight, preferably from 0.1 to 2% by weight, and particularly preferably from 0.2 to 1% by weight. The di- or oligofunctional oxazolines, oxazines and/or carbodiimides can also be used as acid scavenger. In this embodiment, it is preferable that the concentration used of the di- or oligofunctional oxazolines, oxazines and/or carbodiimides is from 0.01 to 0.5% by weight.

In the polyaddition reaction, the copolyester (A2) is preferably fed into an extruder, or into a continuous kneader (List reactor), or into a static mixer, together with from 0.01 to 4% by weight, preferably from 0.1 to 2% by weight, and with particular preference from 0.5 to 1.2% by weight of at least one chain extender, based on the total weight of the copolyester (A2) and the at least one chain extender. The following internals may be mentioned by way of example: the static mixer can use SMR, SMX, or SMXL elements, or a combination of these, e.g. from Sulzer Chemtech AG, Switzerland. Examples of a List reactor, as a function of application sector, are: a single-shaft DISCOTHERM B or twin-shaft CRP or ORP reactors. Extruders that can be used are single- or twin-screw extruders.

The polyaddition reaction takes preferably place at reaction temperatures of from 220 to 270° C., preferably from 230 to 250° C., and at superatmospheric pressure or atmospheric pressure, as a function of the system used.

Preferably, after the polyaddition reaction, the resulting product is supplied to the mixing device (MD2).

Polymer Melt (M3)

The polymer melt (M3) comprises a copolyester (A3) on the basis of terephthalic acid, at least one polytetramethylene glycol and at least one aliphatic 1, ω-diol.

Preferably, the polymer melt (M3) comprises at least 90% by weight, more preferably at least 95% by weight, and most preferably at least 97% by weight of the copolyester (A3), based on the total weight of the polymer melt (M3).

Likewise, the polymer melt (M3) preferably comprises not more than 99.99% by weight, more preferably not more than 99.9% by weight, and most preferably not more than 99.8% by weight of the copolyester (A3), based on the total weight of the polymer melt (M3).

In a preferred embodiment, the polymer melt (M3) comprises from 90 to 99.99% by weight, preferably from 95 to 99.9% by weight, and especially from 97 to 99.8% by weight of the copolyester (A3), based on the total weight of the polymer melt (M3).

The polymer melt (M3) can also comprise at least one additive (A). What is meant by "at least one additive (A)" is precisely one additive (A) as well as mixtures of two or more additives (A).

The above-mentioned embodiments and preferences with respect to the at least one additive (A) comprised in the polymer melt (M1) apply analogously to the at least one additive (A) comprised in the polymer melt (M3).

The polymer melt (M3) preferably comprises at least 0.01% by weight, more preferably at least 0.1% by weight and most preferably at least 0.2% by weight of the at least one additive (A), based on the total weight of the polymer melt (M3).

Likewise, the polymer melt (M3) preferably comprises not more than 10% by weight, more preferably not more than 5% by weight and most preferably not more than 3% by weight of the at least one additive (A), based on the total weight of the polymer melt (M3).

In a preferred embodiment, the polymer melt (M3) comprises from 0.01 to 10% by weight, preferably from 0.1 to 5% by weight and especially from 0.2 to 3% by weight of the at least one additive (A), based on the total weight of the polymer melt (M3).

The percent by weight of the copolyester (A3) and the at least one additive (A) in the polymer melt (M3) generally add up to 100%.

Further, the polymer melt (M3) can also comprise at least one catalyst (C) as well as at least one antioxidant, wherein the at least one catalyst (C) as well as the at least one antioxidant result from the production process of the copolyester (A3).

In case the polymer melt (M3) comprises at least one catalyst (C) and at least one antioxidant, the percent by weight of the copolyester (A3), the at least one additive (A), the at least one catalyst (C) and the at least one antioxidant in the polymer melt (M3) generally add up to 100%.

Preferably, the copolyester (A3) is the polycondensation product of
i) 100 mol % based on component i) of terephthalic acid,
ii) 30 to 74 mol % based on component i) of at least one polytetramethylene glycol, and
iii) 30 to 74 mol % based on component i) of at least aliphatic 1, ω-diol,
wherein the sum of components ii) and iii) is in the range from 100 to 104 mol %.

Therefore, the present invention also provides a method wherein the copolyester (A3) is the polycondensation product of
i) 100 mol %, based on component i), of terephthalic acid,
ii) 30 to 74 mol %, based on component i), of at least one polytetramethylene glycol, and
iii) 30 to 74 mol %, based on component i), of at least one aliphatic 1, ω-diol,
wherein the sum of components ii) and iii) is in the range from 100 to 104 mol %.

The above-mentioned embodiments and preferences with respect to the terephthalic acid and the at least one aliphatic 1, ω-diol used in the preparation of the terephthalate polyester (A1) comprised in the polymer melt (M1) apply analogously to the terephthalic acid and the at least one aliphatic 1, ω-diol used in the preparation of the copolyester (A3) comprised in the polymer melt (M3).

Therefore, the present invention also provides a method, wherein the at least one aliphatic 1, ω-diol is selected from the group consisting of 1,2-ethanediol, 1,3-propanediol, 1,4-butanediol and diethylene glycol.

"At least one polytetramethylene glycol" means precisely one polytetramethylene glycol as well as mixtures of two or more polytetramethylene glycols. In a preferred embodiment, only one polytetramethylene glycol is used.

The at least one polytetramethylene glycol is preferably obtained by the polymerization of tetra methylene oxide.

The weight-average molecular weight (Mw) of the at least one polytetramethylene glycol is generally in the range from 600 to 2400 g/mol, preferably in the range from 600 to 2000 g/mol and more preferably in the range from 1200 to 2000 g/mol. The weight-average molecular weight (Mw) is measured using gel permeation chromatography (GPC). Dimethylacetamide (DMAc) was used as solvent and narrowly distributed polymethyl methacrylate was used as standard in the measurement.

The melting temperature ($T_M$) of the copolyester (A3) is customarily in the range from 60 to 220° C., preferably in the range from 100 to 200° C., and more preferably in the range from 120 to 170° C., determined by differential scanning calorimetry (DSC) or by dynamic mechanical thermoanalysis (DMTA).

The weight average molecular weight ($M_w$) of the copolyester (A3) is customarily in the range from 2 000 to 150 000 g/mol, preferably in the range from 10 000 to 120 000 g/mol, and more preferably in the range from 20 000 to 80 000 g/mol. The weight average molecular weight ($M_w$) is determined according to ASTM D5001.

To obtain the polymer melt (M3), the copolyester (A3) and optionally the at least one additive (A) are preferably melt-mixed in a mixing device (MD3).

The melt-mixing is preferably carried out motionlessly, for example statically.

Preferably, the at least one additive (A) is added to the copolyester (A3) in the mixing device (MD3).

If present, the at least one additive (A) is also added in a customary manner to the copolyester (A3), for example individually or together, as such, as a solution, a melt, a suspension or as a masterbatch.

Production of the (Co)Polyesters

Preferably, the (co)polyesters (A1), (A2) and (A3) originate from a process, wherein the (co)polyesters (A1), (A2) and (A3) are combinedly produced.

The method of the combined production of the (co)polyesters (A1), (A2) and (A3) preferably comprises the steps of performing alternatingly at least two of the following operation modes selected from the group consisting of (OP1), (OP2), (OP3), (OP4), (OP5) and (OP6), wherein
  (OP1) is the production of the terephthalate polyester (A1),
  (OP2) is the simultaneous production of the terephthalate polyester (A1) and the copolyester (A2) on the basis of terephthalic acid, at least one aliphatic 1, ω-dicarboxylic acid and at least one aliphatic 1, ω-diol,
  (OP3) is the production of the copolyester (A3) on the basis of terephthalic acid, at least one polytetramethylene glycol and at least one aliphatic 1, ω-diol,
  (OP4) is the simultaneous production of the copolyester (A2), the copolyester (A3) and optionally the terephthalate polyester (A1),
  (OP5) is the production of the copolyester (A2), and
  (OP6) is the simultaneous production of the terephthalate polyester (A1) and the copolyester (A3).

The operation modes (OP1), (OP2), (OP3), (OP4), (OP5) and (OP6) are preferably carried out in a main reactor (HR).

The main reactor (HR) preferably comprises a first main reactor unit (R1), a third main reactor unit (R3) and optionally a second main reactor unit (R2). Preferably, the main reactor (HR) is selected from reactors having a horizontal flow direction or from reactors having a vertical flow direction.

Examples for reactors having a horizontal flow direction are rotating cage reactors, rotating disc reactors and kneaders, examples for reactors having a vertical flow direction are wiped falling film evaporators and preferably multi tube thin film evaporators.

Operation Modes

OP1

Operation mode (OP1) is the production of the terephthalate polyester (A1) and comprises the following steps a) to c):
  a) supplying at least one first oligomer composition (OC1) to a main reactor comprising the main reactor units (R1), (R3) and optionally (R2),
  b) polycondensation of the at least one first oligomer composition (OC1) in the main reactor units (R1), (R3) and optionally (R2), wherein the terephthalate polyester (A1) is obtained,
  c) removing the terephthalate polyester (A1) from the main reactor units (R1), (R3) and optionally (R2).

In step a), at least one first oligomer composition (OC1) is supplied. What is meant by "at least one first oligomer composition (OC1)" is precisely one first oligomer composition (OC1) as well as mixtures of two or more first oligomer compositions (OC1).

The at least one first oligomer composition (OC1) comprises at least one first oligomer (O1). What is meant by "at least one first oligomer (O1)" is precisely one first oligomer (O1) as well as mixtures of two or more first oligomers (O1).

The at least one first oligomer composition (OC1) preferably comprises at least 94% by weight, more preferably at least 96.5% by weight and most preferably at least 98.8% by weight of the at least one first oligomer (O1), based on the total weight of the oligomer composition (OC1).

Likewise, the at least one first oligomer composition (OC1) preferably comprises not more than 99.98% by weight, more preferably not more than 99.92% by weight and most preferably not more than 99.85% by weight of the at least one first oligomer (O1), based on the total weight of the oligomer composition (OC1).

In a preferred embodiment, the at least one oligomer composition (OC1) comprises from 94 to 99.98% by weight, preferably from 96.5 to 99.92% by weight and especially from 98.8 to 99.85% by weight of the at least one first oligomer (O1), based on the total weight of the oligomer composition (OC1).

The at least one first oligomer composition (OC1) can also comprise at least one antioxidant. What is meant by "at least one antioxidant" is precisely one antioxidant as well as mixtures of two or more antioxidants.

Suitable antioxidants include, but are not limited to, sterically hindered phenols, secondary aromatic amines, hydroquinones, resorcinols, vitamin E or analogous-structure compounds, copper(I) halides, hindered amine light stabilizers ("HALS"), quenchers, such as nickel quenchers, hydroperoxide decomposers, triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones and salicylates.

The at least one first oligomer composition (OC1) preferably comprises at least 0.01% by weight, more preferably at least 0.05% by weight and most preferably at least 0.1% by weight of the at least one antioxidant, based on the total weight of the oligomer composition (OC1).

Likewise, the at least one first oligomer composition (OC1) preferably comprises not more than 5% by weight, more preferably not more than 3% by weight and most preferably not more than 1% by weight of the at least one antioxidant, based on the total weight of the oligomer composition (OC1).

In a preferred embodiment, the at least one first oligomer composition (OC1) comprises from 0.01 to 5% by weight, preferably from 0.05 to 3% by weight and especially from 0.1 to 1% by weight of the at least one antioxidant, based on the total weight of the oligomer composition (OC1).

The at least one first oligomer composition (OC1) can also comprise at least one catalyst (C). What is meant by "at least one catalyst (C)" is precisely one catalyst (C) as well as mixtures of two or more catalysts (C).

Preferably, the at least one catalyst (C) is selected from the group consisting of Lewis acid metal compounds.

Lewis acid metal compounds are known to a skilled person. Examples for Lewis acid metal compounds are tetrabutyl orthotitanate (TBOT), triisopropyl titanate and tin dioctoate.

In a preferred embodiment, the at least one catalyst (C) is tetrabutyl orthotitanate (TBOT).

The at least one first oligomer composition (OC1) preferably comprises at least 0.01% by weight, more preferably at least 0.03% by weight and most preferably at least 0.05% by weight of the at least one catalyst (C), based on the total weight of the oligomer composition (OC1).

Likewise, the at least one first oligomer composition (OC1) preferably comprises not more than 1% by weight, more preferably not more than 0.5% by weight and most preferably not more than 0.2% by weight of the at least one catalyst (C), based on the total weight of the oligomer composition (OC1).

In a preferred embodiment, the at least one first oligomer composition (OC1) comprises from 0.01 to 1% by weight, preferably from 0.03 to 0.5% by weight and especially from 0.05 to 0.2% by weight of the at least one catalyst (C), based on the total weight of the oligomer composition (OC1).

The percent by weight of the at least one first oligomer (O1), the at least one antioxidant and the at least one catalyst (C) in the oligomer composition (OC1) generally add up to 100%.

The at least one first oligomer composition (OC1) has preferably an OH number in the range from 30 to 80 mg KOH/g, more preferably in the range from 40 to 80 mg KOH/g, and most preferably in the range from 50 to 80 mg KOH/g according to DIN 53240, part 2.

The at least one first oligomer (O1) is preferably obtained by the condensation reaction of terephthalic acid and at least one aliphatic 1, ω-diol. In other words, the at least one first oligomer (O1) is preferably the condensation product of terephthalic acid and at least one aliphatic 1, ω-diol.

The at least one first oligomer (O1) is preferably the condensation product of
i) 100 mol %, based on component i), of terephthalic acid, and
ii) 100 to 104 mol %, based on component i), of at least one aliphatic 1, ω-diol.

However, it is also possible to use at least one aromatic 1, ω-dicarboxylic acid which is different from terephthalic acid, for example, phthalic acid, 2,5-furandicarboxylic acid, 2,6-naphthalenedicarboxylic acid or 1,5-.naphthalenedicarboxylic acid, or a combination of terephthalic acid and at least one different aromatic 1, ω-dicarboxylic acid.

In this case, the at least one first oligomer (O1) is preferably the condensation product of
i) 100 mol %, based on component i), of at least one aromatic 1, ω-dicarboxylic acid, and
ii) 100 to 104 mol %, based on component i), of at least one aliphatic 1, ω-diol.

The above-mentioned embodiments and preferences with respect to the at least one aliphatic 1, ω-diol, the at least one aromatic 1, ω-dicarboxylic acid and the terephthalic acid used in the preparation of terephthalate polyester (A1) apply analogously to the at least one aliphatic 1, ω-diol, the at least one aromatic 1, ω-dicarboxylic acid and the terephthalic acid used in the preparation of the at least one first oligomer (O1).

The weight average molecular weight ($M_w$) of the at least one first oligomer (O1) is customarily in the range from 200 to 2200 g/mol, preferably in the range from 400 to 2000 g/mol, and more preferably in the range from 600 to 1800 g/mol. The weight average molecular weight ($M_w$) is determined according to ASTM D4001.

The polycondensation of the at least one first oligomer composition (OC1) in the main reactor units (R1), (R3) and optionally (R2) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

It is clear for a skilled person that at these temperatures, the at least one first oligomer (O1) in the at least one first oligomer composition (OC1) as well as the terephthalate polyester (A1) are present in the molten form.

Preferably, after removing the terephthalate polyester (A1) from the main reactor units (R1), (R3) and optionally (R2), the terephthalate polyester (A1) is supplied to the mixing device (MD1). Preferably, the terephthalate polyester (A1) is supplied to the mixing device (MD1) in the molten form.

OP2

Operation mode (OP2) is the simultaneous production of the terephthalate polyester (A1) and the copolyester (A2) on the basis of terephthalic acid, at least one aliphatic 1, ω-dicarboxylic acid and at least one aliphatic 1, ω-diol and comprises the following steps a) to d):
a) supplying at least one first oligomer composition (OC1) to the main reactor units (R1), (R3) and optionally (R2), and
b) supplying at least one second oligomer composition (OC2) to the first main reactor unit (R1),
c) polycondensation of the at least one first oligomer composition (OC1) and the at least one second oligomer composition (OC2) in the main reactor unit (R1), wherein the copolyester (A2) is obtained, and polycondensation of the at least one first oligomer composition (OC1) in main reactor units (R3) and optionally (R2), wherein the terephthalate polyester (A1) is obtained,
d) removing the copolyester (A2) from the main reactor unit (R1), and removing terephthalate polyester (A1) from the main reactor units (R3) and optionally (R2).

The abovementioned embodiments and preferences with respect to the at least one first oligomer composition (OC1) supplied in operation mode (OP1) apply analogously to the at least one first oligomer composition (OC1) supplied in operation mode (OP2).

In step b), at least one second oligomer composition (OC2) is supplied to the first main reactor unit (R1). What is meant by "at least one second oligomer composition (OC2)" is precisely one second oligomer composition (OC2) as well as mixtures of two or more second oligomer compositions (OC2).

The at least one second oligomer composition (OC2) comprises at least one second oligomer (O2).

What is meant by "at least one second oligomer (O2)" is precisely one second oligomer (O2) as well as mixtures of two or more second oligomers (O2).

The at least one second oligomer composition (OC2) preferably comprises at least 94% by weight, more preferably at least 96.5% by weight and most preferably at least 98.8% by weight of the at least one second oligomer (O2), based on the total weight of the oligomer composition (OC2).

Likewise, the at least one second oligomer composition (OC2) preferably comprises not more than 99.98% by weight, more preferably not more than 99.92% by weight and most preferably not more than 99.85% by weight of the at least one second oligomer (O2), based on the total weight of the at least one second oligomer composition (OC2).

In a preferred embodiment, the at least one oligomer composition (OC2) comprises from 94 to 99.98% by weight, preferably from 96.5 to 99.92% by weight and especially from 98.8 to 99.85% by weight of the at least one second oligomer (O2), based on the total weight of the oligomer composition (OC2).

The at least one second oligomer composition (OC2) can also comprise at least one antioxidant. What is meant by "at least one antioxidant" is precisely one antioxidant as well as mixtures of two or more antioxidants.

Further, the at least one second oligomer composition (OC2) can also comprise at least one catalyst (C). What is meant by "at least one catalyst (C)" is precisely one catalyst (C) as well as mixtures of two or more catalysts (C).

The abovementioned embodiments and preferences with respect to the at least one antioxidant and the at least one catalyst (C) comprised in the at least one first oligomer composition (OC1) apply analogously to the at least one antioxidant and the at least one catalyst (C) comprised in the at least one second oligomer composition (OC2).

The percent by weight of the at least one second oligomer (O2), the at least one antioxidant and the at least one catalyst (C) in the oligomer composition (OC2) generally add up to 100%.

Preferably, the at least one second oligomer composition (OC2) has an OH number in the range from 30 to 80 mg KOH/g according to DIN 53240, part 2.

The at least one second oligomer (O2) is obtained by the condensation reaction of at least one aliphatic 1, ω-dicarboxylic acid and at least one aliphatic 1, ω-diol. In other words, the at least one second oligomer (O2) is the condensation product of the at least one aliphatic 1, ω-dicarboxylic acid and the at least one aliphatic 1, ω-diol.

The at least one first oligomer (O2) is preferably the condensation product of
i) 100 mol %, based on components i), of at least one aliphatic 1, ω-dicarboxylic acid, and
iii) 100 to 106 mol %, based on component i), of at least one aliphatic 1, ω-diol.

The above-mentioned embodiments and preferences with respect to the at least one aliphatic 1, ω-diol and the at least one aliphatic 1, ω-dicarboxylic acid used in the preparation of copolyester (A2) apply analogously to the at least one aliphatic 1, ω-diol and the at least one aliphatic 1, ω-dicarboxylic acid used in the preparation of the at least one first oligomer (O2).

The weight average molecular weight ($M_w$) of the at least one second oligomer (O2) is customarily in the range from 200 to 2600 g/mol, preferably in the range from 400 to 2400 g/mol, and especially preferably in the range from 500 to 2000 g/mol. The weight average molecular weight ($M_w$) is determined according to ASTM D4001.

The polycondensation of the at least one first oligomer composition (OC1) and the at least one second oligomer composition (OC2) in the main reactor unit (R1) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

It is clear for a skilled person that at these temperatures, the at least one first oligomer (O1) in the at least one first oligomer composition (OC1), the at least one second oligomer (O2) in the at least one second oligomer composition (OC2) and the terephthalate polyester (A1) and the copolyester (A2) are present in the molten form.

Preferably, after removing the copolyester (A2) from the main reactor unit (R1), and removing terephthalate polyester (A1) from the main reactor units (R3) and optionally (R2), the terephthalate polyester (A1) is supplied to the mixing device (MD1) and the copolyester (A2) is supplied to the mixing device (MD2). Preferably, the terephthalate polyester (A1) and the copolyester (A2) are supplied to the mixing devices (MD1) and (MD2) in the molten form.

OP3

Operation mode (OP3) is the production of the copolyester (A3) and comprises the following steps a) to d):
a) supplying at least one first oligomer composition (OC1) to the main reactor units (R1), (R3) and optionally (R2), and
b) supplying at least one third oligomer composition (OC3) to the main reactor units (R1), (R3) and optionally (R2)
c) polycondensation of the at least one first oligomer composition (OC1) and the at least one third oligomer composition (OC3) in the main reactor units (R1), (R3) and optionally (R2), wherein the copolyester (A3) is obtained,
d) removing the copolyester (A3) from the main reactor units (R1), (R3) and optionally (R2).

The abovementioned embodiments and preferences with respect to the at least one first oligomer composition (OC1) supplied in operation mode (OP1) apply analogously to the at least one first oligomer composition (OC1) supplied in operation mode (OP3).

What is meant by "at least one third oligomer composition (OC3)" is precisely one third oligomer composition (OC3) as well as mixtures of two or more third oligomer compositions (OC3).

The at least one third oligomer composition (OC3) comprises at least one third oligomer (O3). What is meant by "at least one third oligomer (O3)" is precisely one third oligomer (O3) as well as mixtures of two or more third oligomers (O3).

The at least one third oligomer composition (OC3) preferably comprises at least 94% by weight, more preferably at least 96.5% by weight and most preferably at least 98.8% by weight of the at least one third oligomer (O3), based on the total weight of the third oligomer composition (OC3).

Likewise, the at least one third oligomer composition (OC3) preferably comprises not more than 99.98% by weight, more preferably not more than 99.92% by weight and especially preferably not more than 99.85% by weight of the at least one third oligomer (O3), based on the total weight of the at least one third oligomer composition (OC3).

In a preferred embodiment, the at least one third oligomer composition (OC3) comprises from 94 to 99.98% by weight, preferably from 96.5 to 99.92% by weight and especially from 98.8 to 99.85% by weight of the at least one third oligomer (O3), based on the total weight of the third oligomer composition (OC3).

The at least one third oligomer composition (OC3) can also comprise at least one additive (A), which is preferably at least one antioxidant. What is meant by "at least one antioxidant" is precisely one antioxidant as well as mixtures of two or more antioxidants.

Further, the at least one third oligomer composition (OC3) can also comprise at least one catalyst (C). What is meant by "at least one catalyst (C)" is precisely one catalyst (C) as well as mixtures of two or more catalysts (C).

The abovementioned embodiments and preferences with respect to the at least one antioxidant and the at least one catalyst (C) comprised in the at least one first oligomer composition (OC1) apply analogously to the at least one antioxidant and the at least one catalyst (C) comprised in the at least one third oligomer composition (OC3).

The percent by weight of the at least one third oligomer (O3), the at least one antioxidant and the at least one catalyst (C) in the third oligomer composition (OC3) generally add up to 100%.

The at least one third oligomer (O3) is obtained by the polymerization of tetra methylene oxide. In other words, the at least one third oligomer (O3) is the polymerization product of tetra methylene oxide (polytetramethylene glycol).

The above-mentioned embodiments and preferences with respect to polytetramethylene glycol used in the preparation of copolyester (A3) apply analogously to the polytetramethylene glycol used in the preparation of the at least one first oligomer (O3).

The polycondensation of the product (PR1) in the main reactor units (R1), (R3) and optionally (R2) is generally carried out at temperatures of generally from 225° C. to 290° C., preferably from 230° C. to 270° C., particularly preferably from 235° C. to 265° C. The pressure is generally from 0.05 to 10 mbar, preferably from 0.1 to 1 mbar.

It is clear for a skilled person that at these temperatures, the product (P1) as well as the copolyester (A3) are present in the molten form.

Preferably, after removing the copolyester (A3) from the main reactor units (R1), (R3) and optionally (R2), the copolyester (A3) is supplied to the mixing device (MD3). Preferably, the copolyester (A3) is supplied to the mixing device (MD3) in the molten form.

OP4

Operation mode (OP4) is the simultaneous production of the copolyester (A2), the copolyester (A3) and, optionally the terephthalate polyester (A1). Operation mode (OP4) comprises the following steps a) to d):
  a) supplying at least one first oligomer composition (OC1) to the main reactor units (R1), (R3) and optionally (R2),
  b) supplying at least one second oligomer composition (OC2) to the first main reactor unit (R1),
  c) supplying at least one third oligomer composition (OC3) to the third main reactor unit (R3),
  d) polycondensation of the at least one first oligomer composition (OC1) and the at least one second oligomer composition (OC2) in the main reactor unit (R1), wherein the copolyester (A2) is obtained, polycondensation of the at least one first oligomer composition (OC1) and the at least one third oligomer composition (OC3) in the main reactor unit (R3), wherein the copolyester (A3) is obtained and, optionally polycondensation of the at least one first oligomer composition (OC1) in the main reactor unit (R2), wherein the terephthalate polyester (A1) is obtained
  e) removing the copolyester (A2) from the main reactor unit (R1), removing the copolyester (A3) from the main reactor unit (R3), and optionally removing the terephthalate polyester (A1) from the main reactor unit (R2).

OP5

Operation mode (OP5) is the production of the copolyester (A2) and comprises the following steps a) to d):
  a) supplying at least one first oligomer composition (OC1) to the main reactor units (R1), (R3) and optionally (R2), and
  b) supplying at least one second oligomer composition (OC2) to the main reactor units (R1), (R3) and optionally (R2),
  c) polycondensation of the at least one first oligomer composition (OC1) and the at least one second oligomer composition (OC2) in the main reactor units (R1), (R3) and optionally (R2), wherein the copolyester (A2) is obtained,
  d) removing the copolyester (A2) from the main reactor units (R1), (R3) and optionally (R2).

OP6

Operation mode (OP6) is the simultaneous production of the terephthalate polyester (A1) and the copolyester (A3). Operation mode (OP6) comprises the following steps a) to d):
  a) supplying at least one first oligomer composition (OC1) to the main reactor units (R1), (R3) and optionally (R2), and
  b) supplying at least one third oligomer composition (OC3) to the main reactor unit (R3),
  c) polycondensation of the at least one first oligomer composition (OC1) and the at least one third oligomer composition (OC3) in the main reactor unit (R3), wherein the copolyester (A3) is obtained, and polycondensation of the at least one first oligomer composition (OC1) in the main reactor units (R1) and optionally (R2), wherein the terephthalate polyester (A1) is obtained,
  d) removing the copolyester (A3) from the main reactor unit (R3), and removing the terephthalate polyester (A1) from the main reactor units (R1) and optionally (R2).

In FIGS. 1 and 2, the operation modes (OP1), (OP2), (OP3), (OP4), (OP5) and (OP6) are schematically shown:

By performing operation mode (OP1; a), the at least one first oligomer composition (OC1) is supplied to a main reactor comprising the main reactor units (R1), (R3) and optionally (R2), wherein the at least one first oligomer composition (OC1) is polycondensated to obtain the terephthalate polyester (A1). The terephthalate polyester (A1) is removed from the reactor units (R1), (R3) and optionally (R2).

By performing operation mode (OP2; a+b2), the at least one first oligomer composition (OC1) is supplied to the main reactor units (R1), (R3) and optionally (R2), and the at least one second oligomer composition (OC2) is supplied to the first main reactor unit (R1). The at least one first oligomer composition (OC1) is polycondensated in main reactors (R3) and optionally (R2) to obtain the terephthalate polyester (A1) and the at least one first oligomer composition (OC1) and the at least one second oligomer composition (OC2) are polycondensated in the first main reactor unit (R1) to obtain the copolyester (A2). The copolyester (A2) is removed from the reactor unit (R1) and the terephthalate polyester (A1) is removed from the reactor units (R3) and optionally (R2).

By performing operation mode (OP3; a+c1), the at least one first oligomer composition (OC1) is supplied to the main reactor units (R1), (R3) and optionally (R2), and the at least one third oligomer composition (OC3) is supplied to the main reactor units (R1), (R3) and optionally (R2). The at least one first oligomer composition (OC1) and the at least one third oligomer composition (OC3) are polycondensated in the main reactor units (R1), (R3) and optionally (R2) to obtain the copolyester (A3). The copolyester (A3) is removed from the reactor units (R1), (R3) and optionally (R2).

By performing operation mode (OP4; a+b2+c2), the at least one first oligomer composition (OC1) is supplied to the main reactor units (R1), (R3) and optionally (R2), the at least one second oligomer composition (OC2) is supplied to the main reactor unit (R1), and the at least one third oligomer composition (OC3) is supplied to the main reactor unit (R3). The at least one first oligomer composition (OC1) and the at least one third oligomer composition (OC3) are polycondensated in the main reactor unit (R3) to obtain the copolyester (A3), the at least one first oligomer composition (OC1) and the at least one second oligomer composition (OC2) are polycondensated in the main reactor unit (R1) to obtain the copolyester (A2), and optionally the at least one first oligomer composition (OC1) is polycondensated in the main reactor unit (R2) to obtain the terephthalate polyester (A1). The copolyester (A3) is removed from the reactor unit (R3), the copolyester (A2) is removed from the reactor unit (R1), and optionally the terephthalate polyester (A1) is removed from the reactor unit (R2).

By performing operation mode (OP5; a+b1), the at least one first oligomer composition (OC1) is supplied to the main reactor units (R1), (R3) and optionally (R2), and the at least one second oligomer composition (OC2) is supplied to the main reactor units (R1), (R3) and optionally (R2). The at least one first oligomer composition (OC1) and the at least one second oligomer composition (OC2) are polycondensated in the main reactor units (R1), (R3) and optionally (R2) to obtain the copolyester (A2). The copolyester (A2) is removed from the reactor units (R1), (R3) and optionally (R2).

By performing operation mode (OP6; a+c2), the at least one first oligomer composition (OC1) is supplied to the main reactor units (R1), (R3) and optionally (R2), and the at least one third oligomer composition (OC3) is supplied to the main reactor unit (R3). The at least one first oligomer composition (OC1) is polycondensated in main reactors (R1) and optionally (R2) to obtain the terephthalate polyester (A1) and the at least one first oligomer composition (OC1) and the at least one third oligomer composition (OC3) are polycondensated in the third main reactor unit (R3) to obtain the copolyester (A3). The copolyester (A3) is removed from the reactor unit (R3) and the terephthalate polyester (A1) is removed from the reactor units (R1) and optionally (R2).

At least two of the operation modes (OP1), (OP2), (OP3), (OP4), (OP5) and (OP6) are alternatingly performed.

Products

Pellets (P1)

In a preferred embodiment, at least one polymer melt of the at least two polymer melts selected from the group consisting of (M1), (M2) and (M3) is processed into pellets (P1), wherein the processing into pellets (P1) comprises the following steps:
a) supplying the at least one polymer melt to a device (D1), wherein the device (D1) comprises a perforated disk (PD),
b) pressing the at least one polymer melt through the perforated disk (PD) into a pelletizing chamber (PC), wherein the pelletizing chamber (PC) comprises a cutting device (CD),
c) using the cutting device (CD) to comminute the at least one polymer melt pressed through the perforated disk (PD) into individual pellets (P1),
d) removing the pellets (P1) from the pelletizing chamber (PC).

Preferably, the device (D1) is a pressurized pipe or a vessel, wherein the pressure is preferably built up by a gear pump. The pipe can be equipped with a mixer. The mixer can be a static mixer or a rotating mixer. An example for a pipe with a rotating mixer is an extruder. In case an extruder is used, the mixing can be carried out more homogeneously.

Therefore, the present invention also provides a method wherein at least one polymer melt of the at least two polymer melts selected from the group consisting of (M1), (M2) and (M3) is processed into pellets (P1), wherein the processing into pellets (P1) comprises the following steps:
a) supplying the at least one polymer melt to a device (D1), wherein the device (D1) comprises a perforated disk (PD),
b) pressing the at least one polymer melt through the perforated disk (PD) into a pelletizing chamber (PC), wherein the pelletizing chamber (PC) comprises a cutting device (CD),
c) using the cutting device (CD) to comminute the at least one polymer melt pressed through the perforated disk (PD) into individual pellets (P1),
d) removing the pellets (P1) from the pelletizing chamber (PC).

"At least one polymer melt" means precisely one polymer melt as well as two or more polymer melts.

It is clear for a skilled person that if two or more polymer melts selected from the group consisting of (M1), (M2) and (M3) are processed into pellets (P1), the polymer melts are processed into pellets (P1) in different devices (D1).

In a preferred embodiment, the processing into pellets (P1) is carried out as underwater pelletization as described above. However, it is also possible to carry out a strand pelletization.

Preferably, the pellets (P1) have an average diameter of from 0.05 mm to 20 mm, more preferably of from 0.2 to 5 mm, and most preferably of from 0.5 to 4 mm.

Therefore, the present invention also provides a method wherein the pellets (P1) have an average diameter of from 0.05 mm to 20 mm.

Fibres (P2)

In a further preferred embodiment, at least one polymer melt of the at least two polymer melts selected from the group consisting of (M1), (M2) and (M3) is processed into fibres (P2), wherein the processing into fibres (P2) comprises the following steps:
a) supplying the at least one polymer melt to a device (D2), wherein the device (D2) comprises at least one spinning nozzle (SN),
b) extruding the at least one polymer melt through the at least one spinning nozzle (SN) in the device (D2), wherein fibres (P2) are obtained,
c) removing the fibres (P2) from the device (D2).

Preferably, the device (D2) is a pressurized pipe or a vessel, wherein the pressure is preferably built up by a gear pump. The pipe can be equipped with a mixer. The mixer can be a static mixer or a rotating mixer. An example for a pipe with a rotating mixer is an extruder. In case an extruder is used, the mixing can be carried out more homogeneously.

Therefore, the present invention also provides a method wherein at least one polymer melt of the at least two polymer melts selected from the group consisting of (M1), (M2) and (M3) is processed into fibres (P2), wherein the processing into fibres (P2) comprises the following steps:
- a) supplying the at least one polymer melt to a device (D2), wherein the device (D2) comprises at least one spinning nozzle (SN),
- b) extruding the at least one polymer melt through the at least one spinning nozzle (SN) in the device (D2), wherein fibres (P2) are obtained,
- c) removing the fibres (P2) from the device (D2).

"At least one polymer melt" means precisely one polymer melt as well as two or more polymer melts.

It is clear for a skilled person that if two or more polymer melts selected from the group consisting of (M1), (M2) and (M3) are processed into fibres (P2), the polymer melts are processed into fibres (P2) in different devices (D2).

The obtained fibres (P2) are preferably spun into a yarn.

Therefore, the present invention also provides a method wherein the fibres (P2) are spun into a yarn.

In one embodiment, the fibres (P2) are preferably dyed before spun into a yarn. In this embodiment, the fibres (P2) are preferably dyed with a disperse dye under pressure and at a temperature above 100° C.

Expanded Particles (P3)

In a further preferred embodiment, at least one polymer melt of the at least two polymer melts selected from the group consisting of (M1), (M2) and (M3) is processed into expanded particles (P3), wherein the processing into expanded particles (P3) comprises the following steps:
- a) supplying the at least one polymer melt to a device (D3), wherein the device (D3) comprises a perforated disk (PD2),
- b) adding at least one blowing agent (BL) to the at least one polymer melt in the device (D3),
- c) mixing the at least one polymer melt and the at least one blowing agent (BL) in the device (D3), wherein a mixture (M1) is obtained,
- d) pressing the mixture (M1) through the perforated disk (PD2) into a pelletizing chamber (PC2), wherein the pelletizing chamber (PC2) comprises a cutting device (CD2),
- e) using the cutting device (CD2) to comminute the mixture (M1) pressed through the perforated disk (PD2) into individual expanded particles (P3),
- f) removing the expanded particles (P3) from the pelletizing chamber (PC2).

Preferably, the device (D3) is a pressurized pipe or a vessel, wherein the pressure is preferably built up by a gear pump. The pipe can be equipped with a mixer. The mixer can be a static mixer or a rotating mixer. An example for a pipe with a rotating mixer is an extruder. In case an extruder is used, the mixing can be carried out more homogeneously.

Therefore, the present invention also provides a method wherein at least one polymer melt of the at least two polymer melts selected from the group consisting of (M1), (M2) and (M3) is processed into expanded particles (P3), wherein the processing into expanded particles (P3) comprises the following steps:
- a) supplying the at least one polymer melt to a device (D3), wherein the device (D3) comprises a perforated disk (PD2),
- b) adding at least one blowing agent (BL) to the at least one polymer melt in the device (D3),
- c) mixing the at least one polymer melt and the at least one blowing agent (BL) in the device (D3), wherein a mixture (M1) is obtained,
- d) pressing the mixture (M1) through the perforated disk (PD2) into a pelletizing chamber (PC2), wherein the pelletizing chamber (PC2) comprises a cutting device (CD2),
- e) using the cutting device (CD2) to comminute the mixture (M1) pressed through the perforated disk (PD2) into individual expanded particles (P3),
- f) removing the expanded particles (P3) from the pelletizing chamber (PC2).

"At least one polymer melt" means precisely one polymer melt as well as two or more polymer melts.

It is clear for a skilled person that if two or more polymer melts selected from the group consisting of (M1), (M2) and (M3) are processed into expanded particles (P3), the polymer melts are processed into expanded particles (P3) in different devices (D3).

In a preferred embodiment, the processing into expanded particles (P3) is carried out as underwater pelletization as described above. By performing an underwater pelletization, the water temperature inhibits an agglomeration of the particles.

Preferably, the blowing agent (BL) comprises $CO_2$ and/or $N_2$. The amount of the blowing agent (BL) in the at least one polymer melt is in the range from 0.5 to 2.5% by weight, more preferably in the range from 0.5 to 2% by weight, and most preferably in the range from 0.5 to 1.5% by weight, based on the total weight of the at least one polymer melt.

In a preferred embodiment, the blowing agent (BL) comprises a co-blowing agent. The co-blowing agent is preferably selected from the group consisting of alkanes, alcohols and halogenated hydrocarbons.

The expanded particles (P3) are preferably further processed into foam mouldings.

Therefore, the present invention also provides a method wherein the expanded particles (P3) are further processed into foam mouldings.

Preforms (P4)

In a further preferred embodiment, at least one polymer melt of the at least two polymer melts selected from the group consisting of (M1), (M2) and (M3) is processed into preforms (P4), wherein the processing into preforms (P4) comprises the following steps:
- a) supplying the at least one polymer melt in at least one mould cavity (D4),
- b) permitting the at least one polymer melt to cool in the at least one mould cavity (D4), wherein at least one preform (P4) is obtained,
- c) removing the at least one preform (P4) from the at least one mould cavity (D4).

Therefore, the present invention also provides a method wherein at least one polymer melt of the at least two polymer melts selected from the group consisting of (M1), (M2) and (M3) is processed into preforms (P4), wherein the processing into preforms (P4) comprises the following steps:
- a) supplying the at least one polymer melt in at least one mould cavity (D4),
- b) permitting the at least one polymer melt to cool in the at least one mould cavity (D4), wherein at least one preform (P4) is obtained,
- c) removing the at least one preform (P4) from the at least one mould cavity (D4).

"At least one polymer melt" means precisely one polymer melt as well as two or more polymer melts.

It is clear for a skilled person that if two or more polymer melts selected from the group consisting of (M1), (M2) and (M3) are processed into preforms (P4), the polymer melts are processed into preforms (P4) in different mould cavities (D4).

Articles (P5)

In a further preferred embodiment, at least one polymer melt of the at least two polymer melts selected from the group consisting of (M1), (M2) and (M3) is processed into articles (P5), wherein the processing into articles (P5) is carried out by blow moulding, injection moulding or extrusion.

Therefore, the present invention also provides a method wherein at least one polymer melt of the at least two polymer melts selected from the group consisting of (M1), (M2) and (M3) is processed into articles (P5), wherein the processing into articles (P5) is carried out by blow moulding, injection moulding or extrusion.

In case the processing into articles (P5) is carried out by extrusion, the extrusion comprises the following steps:
a) supplying the at least one polymer melt to an extruder (D5), wherein the extruder (D5) comprises a die,
b) extruding the at least one polymer melt through the die, wherein an article (P5) is obtained,
c) removing the article (P5) from the extruder (D5).

"At least one polymer melt" means precisely one polymer melt as well as two or more polymer melts.

It is clear for a skilled person that if two or more polymer melts selected from the group consisting of (M1), (M2) and (M3) are processed into articles (P5) by extrusion, the polymer melts are processed into articles (P5) in different extruders (D5).

Figure 3:
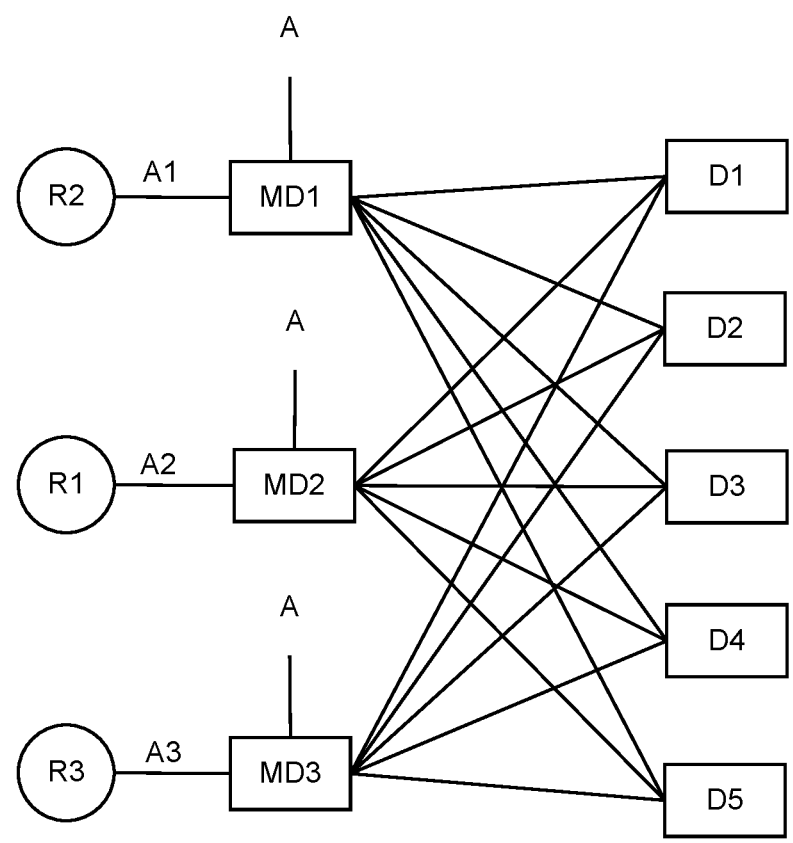
FIG. 3 shows a schematic of reactor units (R1), (R2), and (R3).

In FIG. 3, the combined processing of the at least two polymer melts selected from the group consisting of (M1), (M2) and (M3) is schematically shown by means of operation mode (OP4). The terephthalate polyester (A1), optionally originating from the reactor unit (R2), is melt-mixed in a mixing device (MD1) to obtain a polymer melt (M1), optionally with at least one additive (A). After melt-mixing, the polymer melt (M1) is processed into at least one product selected from the group consisting of pellets (P1), fibres (P2), expanded particles (P3), preforms (P4) and articles (P5) in a device selected from the group consisting of devices (D1), (D2), (D3), (D4) and (D5). The copolyester (A2) originating from the reactor unit (R1) is melt-mixed in a mixing device (MD2) to obtain a polymer melt (M2), also optionally with at least one additive (A). After melt-mixing, the polymer melt (M2) is also processed into at least one product selected from the group consisting of pellets (P1), fibres (P2), expanded particles (P3), preforms (P4) and articles (P5) in a device selected from the group consisting of devices (D1), (D2), (D3), (D4) and (D5). The copolyester (A3) originating from the reactor unit (R3) is melt-mixed in a mixing device (MD3) to obtain a polymer melt (M3), optionally with at least one additive (A). After melt-mixing, the polymer melt (M3) is processed into at least one product selected from the group consisting of pellets (P1), fibres (P2), expanded particles (P3), preforms (P4) and articles (P5) in a device selected from the group consisting of devices (D1), (D2), (D3), (D4) and (D5) as well.

The invention claimed is:

1. A method for a combined processing of at least two polymer melts selected from the group consisting of (M1), (M2), and (M3), wherein
(M1) is a polymer melt comprising a terephthalate polyester (A1),
(M2) is a polymer melt comprising a copolyester (A2) on the basis of terephthalic acid, at least one aliphatic 1,ω-dicarboxylic acid, and at least one aliphatic 1,ω-diol, and
(M3) is a polymer melt comprising a copolyester (A3) on the basis of terephthalic acid, at least one polytetramethylene glycol and at least one aliphatic 1,ω-diol,
the method comprising alternating processing of the at least two polymer melts into at least one product selected from the group consisting of pellets (P1), fibres (P2), expanded particles (P3), preforms (P4), and articles (P5).

2. The method according to claim 1, wherein at least one polymer melt of the at least two polymer melts selected from the group consisting of (M1), (M2), and (M3) is processed into pellets (P1), wherein the processing into pellets (P1) comprises:
a) supplying the at least one polymer melt to a device (D1), wherein the device (D1) comprises a perforated disk (PD),
b) pressing the at least one polymer melt through the perforated disk (PD) into a pelletizing chamber (PC), wherein the pelletizing chamber (PC) comprises a cutting device (CD),
c) using the cutting device (CD) to comminute the at least one polymer melt pressed through the perforated disk (PD) into individual pellets (P1),
d) removing the pellets (P1) from the pelletizing chamber (PC).

3. The method according to claim 1, wherein at least one polymer melt of the at least two polymer melts selected from the group consisting of (M1), (M2) and (M3) is processed into fibres (P2), wherein the processing into fibres (P2) comprises:
a) supplying the at least one polymer melt to a device (D2), wherein the device (D2) comprises at least one spinning nozzle (SN),
b) extruding the at least one polymer melt through the at least one spinning nozzle (SN) in the device (D2), wherein fibres (P2) are obtained,
c) removing the fibres (P2) from the device (D2).

4. The method according to claim 1, wherein the at least one aliphatic 1,ω-dicarboxylic acid is selected from the group consisting of succinic acid, adipic acid, and sebacic acid.

5. The method according to claim 1, wherein the at least one aliphatic 1,ω-diol is selected from the group consisting of 1,2-ethanediol, 1,3-propanediol, 1,4-butanediol, and diethylene glycol.

6. The method according to claim 1, wherein at least one polymer melt of the at least two polymer melts selected from the group consisting of (M1), (M2) and (M3) is processed into expanded particles (P3), wherein the processing into expanded particles (P3) comprises:
a) supplying the at least one polymer melt to a device (D3), wherein the device (D3) comprises a perforated disk (PD2),
b) adding at least one blowing agent (BL) to the at least one polymer melt in the device (D3),
c) mixing the at least one polymer melt and the at least one blowing agent (BL) in the device (D3), wherein a mixture (M1) is obtained,
d) pressing the mixture (M1) through the perforated disk (PD2) into a pelletizing chamber (PC2), wherein the pelletizing chamber (PC2) comprises a cutting device (CD2), e) using the cutting device (CD2) to comminute the mixture (M1) pressed through the perforated disk (PD2) into individual expanded particles (P3), f) removing the expanded particles (P3) from the pelletizing chamber (PC2).

7. The method according to claim 1, wherein at least one polymer melt of the at least two polymer melts selected from the group consisting of (M1), (M2) and (M3) is processed into preforms (P4), wherein the processing into preforms (P4) comprises:
   a) supplying the at least one polymer melt in at least one mould cavity (D4),
   b) permitting the at least one polymer melt to cool in the at least one mould cavity (D4), wherein at least one preform (P4) is obtained,
   c) removing the at least one preform (P4) from the at least one mould cavity (D4).

8. The method according to claim 1, wherein the terephthalate polyester (A1) is the polycondensation product of
   i) 100 mol %, based on component i), of terephthalic acid, and
   ii) 100 to 104 mol %, based on component i), of at least one aliphatic 1,ω-diol.

9. The method according to claim 1, wherein the copolyester (A2) is the polycondensation product of
   i) 30 to 60 mol %, based on components i) to ii), of terephthalic acid,
   ii) 40 to 70 mol %, based on components i) to ii), of at least one aliphatic 1,ω-dicarboxylic acid, and
   iii) 100 to 106 mol %, based on components i) to ii), of at least one aliphatic 1,ω-diol.

10. The method according to claim 1, wherein the copolyester (A3) is the polycondensation product of
    i) 100 mol %, based on component i), of terephthalic acid,
    ii) 30 to 74 mol %, based on component i), of at least one polytetramethylene glycol, and
    iii) 30 to 74 mol %, based on component i), of at least one aliphatic 1,ω-diol,
    wherein the sum of components ii) and iii) is in the range from 100 to 104 mol %.

11. The method according to claim 1, wherein at least one polymer melt of the at least two polymer melts selected from the group consisting of (M1), (M2) and (M3) is processed into articles (P5), wherein the processing into articles (P5) is carried out by blow moulding, injection moulding, or extrusion.

12. The method according to claim 1, wherein the pellets (P1) have an average diameter of from 0.05 mm to 20 mm.

13. The method according to claim 1, wherein the fibres (P2) are spun into a yarn.

14. The method according to claim 1, wherein the expanded particles (P3) are further processed into foam mouldings.

* * * * *